United States Patent Office 3,292,065
Patented Dec. 13, 1966

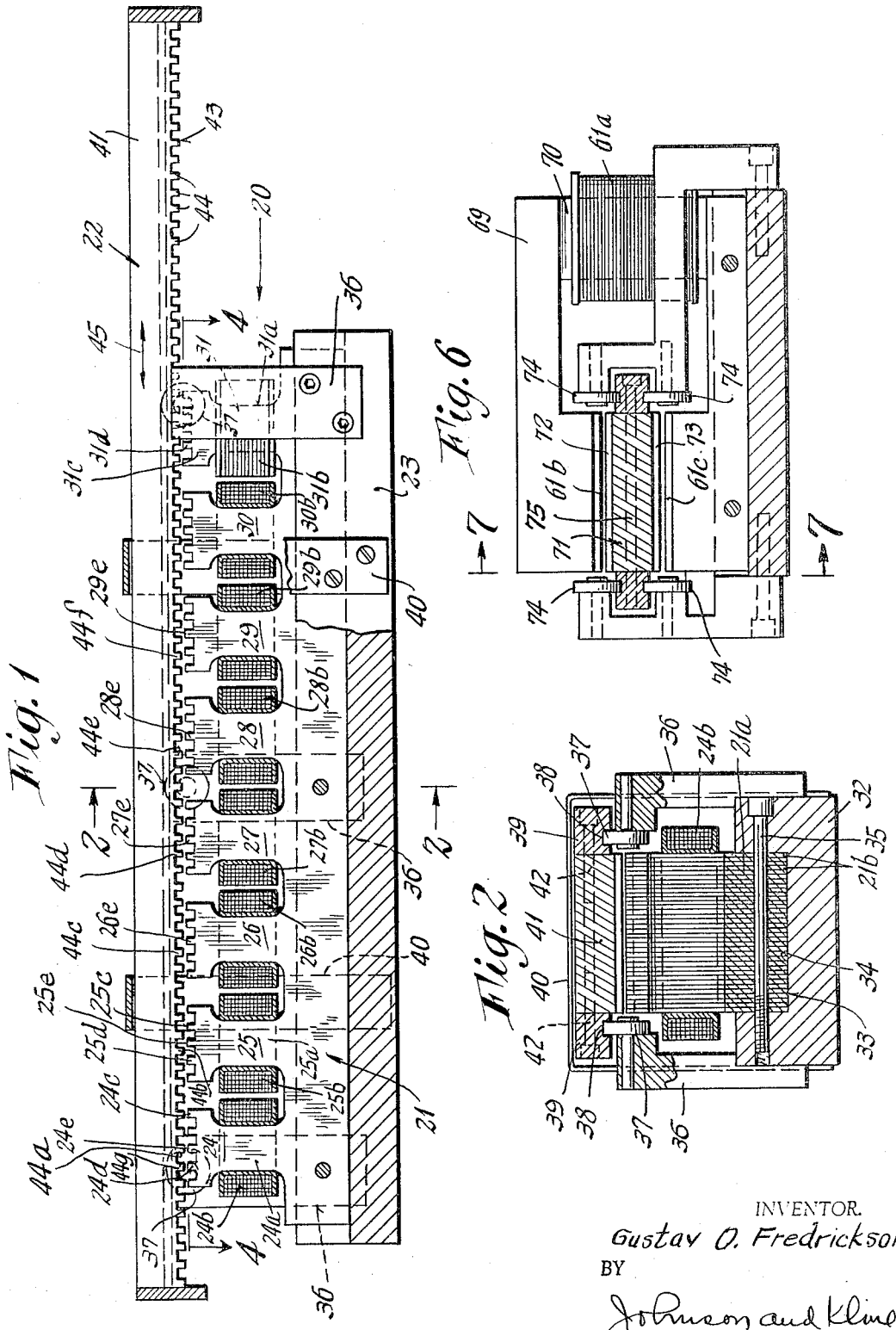

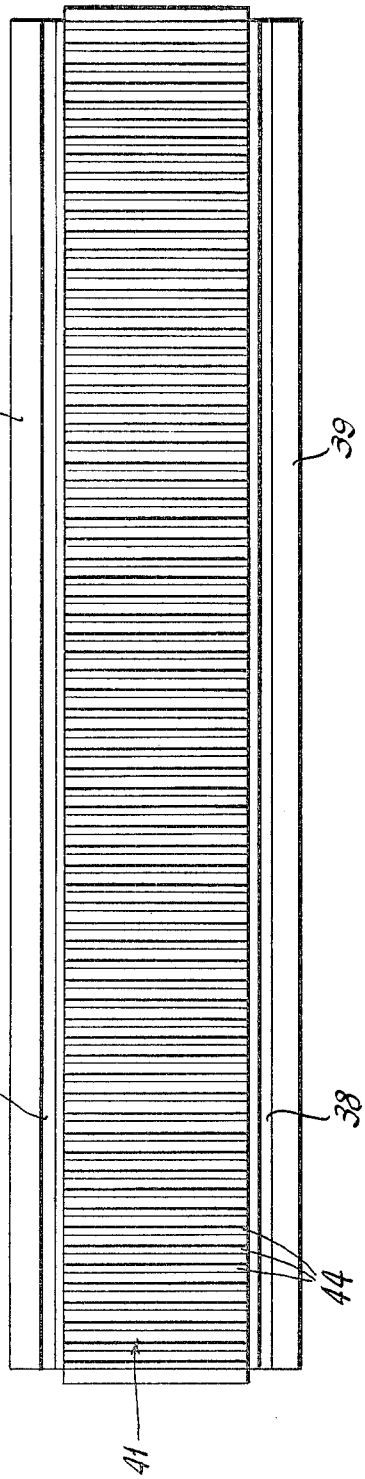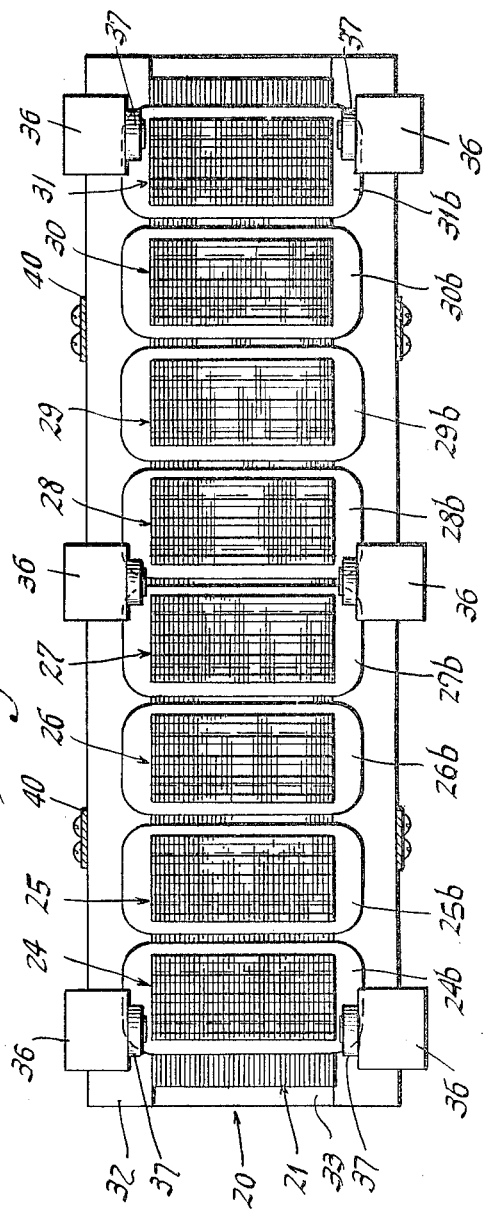

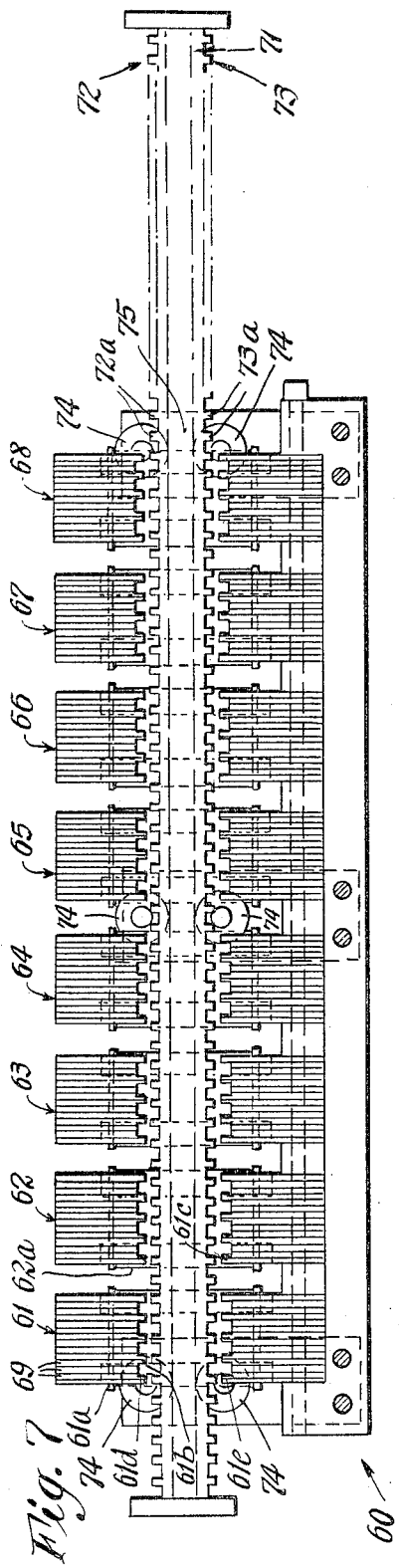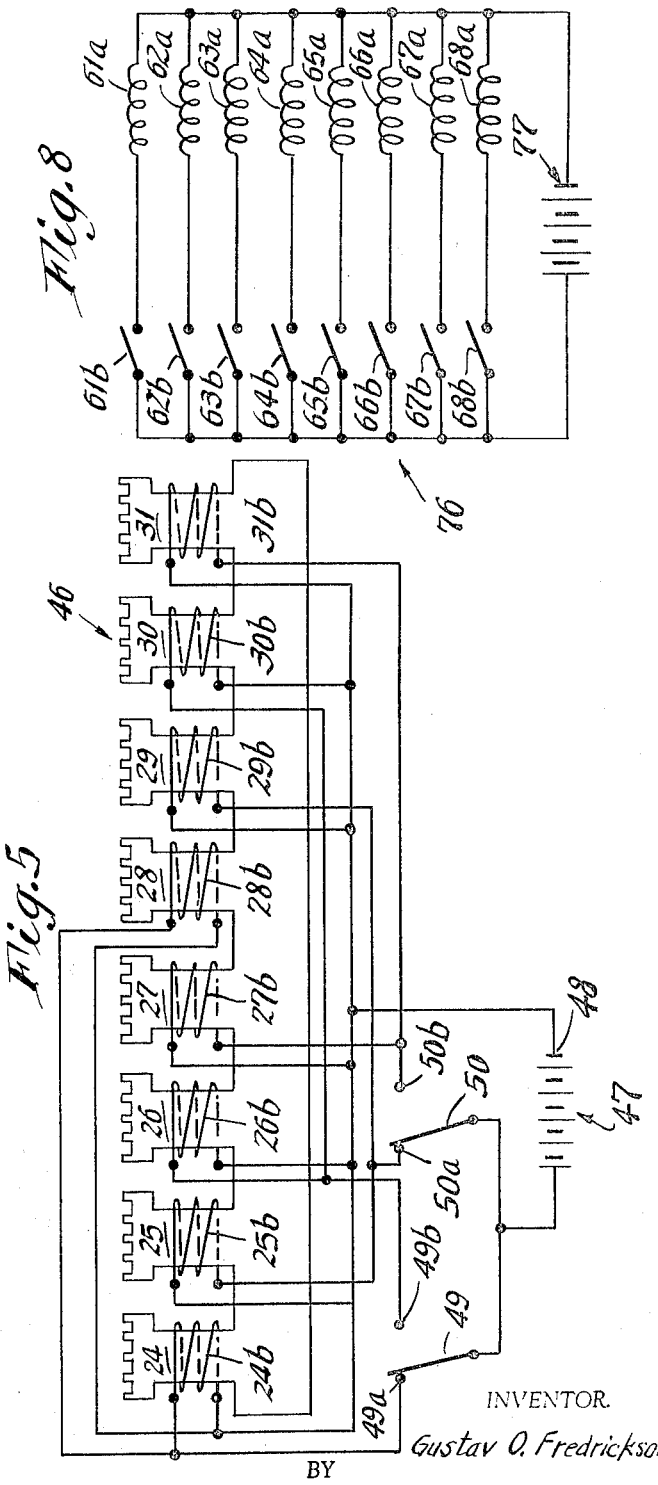

3,292,065
LINEAR ELECTRIC MOTOR AND CONTROL SYSTEM
Gustav O. Fredrickson, Granby, Conn., assignor to The Superior Electric Company, Bristol, Conn., a corporation of Connecticut
Filed Jan. 27, 1964, Ser. No. 340,232
9 Claims. (Cl. 318—135)

The present invention relates to an electric motor that produces linear, reciprocating movement and more particularly to such a motor that produces a determinate linear incremental movement upon a change in an electrical circuit controlling the power to the motor.

While it has heretofore been proposed to provide an electric motor capable of producing linear movement, such devices have not been found completely satisfactory. Thus, in many instances, the motion produced upon actuation consisted only of the movement of the plunger from one extreme position to another without any control of the movement of the plunger inbetween these extremes. In other instances, while movement intermediate the extreme positions has been controllable, the length of movement capable of being controlled has been relatively large and such a motor could thus not provide determinate movement in small precise increments or steps.

It is accordingly an object of the present invention to provide an electric motor which overcomes the above disadvantages and is capable of being controlled to effect small incremental, linear movement or steps of precise length.

Another object of the present invention is to provide such a motor in which the plunger or actuated part may be incrementally moved in either direction and in which the actuated part may be held stationary to resist movement by exterior forces.

A further object of the present invention is to provide an electric motor of the above type with an electric circuit by which the movement of the actuated part may be controlled with changes in the electric circuit producing a positive determinate movement of the plunger.

Still another object of the present invention is to provide an electric motor and electric circuit which is extremely simple in design, composed of relatively few parts, durable in use and relatively economical to manufacture.

In carrying out the present invention, the electric motor is composed of a stator and a plunger or actuated part which is mounted for linear movement with respect to the stator and thus if the stator is maintained stationary, a linear force is thus obtainable from the plunger. In each of the embodiments of the invention hereinafter set forth, the stator is formed with at least two pole pieces that are spaced from each other and have a winding thereon by which the magnetic polarity of the pole piece may be changed by changing the energization of the winding. In addition, each pole piece has a surface adjacent the plunger with said pole surfaces being aligned with the movement of the plunger in such a manner that the surface is maintained a selected distance from the plunger as the latter moves.

In order to achieve the above-recited objects of the invention each pole surface is formed with at least two teeth to thus form a plurality of distinct magnetic poles which have the same magnetic polarity by reason of being integral with the same pole piece. The plunger is mounted for linear movement with respect to the stator, is spaced slightly from the pole surfaces for magnetically cooperating therewith and throughout its operating length is formed with teeth that cooperate with the teeth of the pole surfaces. A change in energization of the stator pole piece windings accordingly effects an incremental movement of the plunger which is a function of the pitch of the plunger teeth rather than being a function of the distance between the pole pieces. In this manner the present invention enables the pole pieces to be relatively widely spaced and be few in number but yet an incremental movement is achieved that is not a function of the spacing of the pole pieces.

The plunger in all embodiments of the invention hereinafter described is formed with equally spaced teeth though in some embodiments it consists merely of a length of paramagnetic material, such as soft iron, without any retained magnetism therein and accordingly functions as a reluctance motor. The plunger is caused to move upon a change in the polarity of the magnetization of the stator pole pieces a fraction of a tooth pitch of the plunger to thus produce an incremental movement of the plunger which is less than the distance between adjacent pole pieces.

Other features and advantages will hereinafter appear.

In the drawing:

FIGURE 1 is an elevation, partly in section, of one embodiment of the reciprocating electric motor of the present invention.

FIG. 2 is a section taken on the line 2—2 of FIG. 1.

FIG. 3 is a plan view of the plunger of the motor shown in FIG. 1.

FIG. 4 is a plan view of the stator taken on the line 4—4 of FIG. 1 with the plunger removed.

FIG. 5 is a schematic and pictorial diagram of an electric control circuit for the embodiment of the motor shown in FIG. 1.

FIG. 6 is a vertical section of another embodiment of a reciprocating motor.

FIG. 7 is an elevational section taken on the line 7—7 of FIG. 6.

FIG. 8 is an electrical schematic diagram of a control circuit for the embodiment of the reciprocating motor shown in FIGS. 6 and 7.

Referring to the drawing, the reciprocating electric motor of the present invention, shown in FIGS. 1–5 inclusive, is generally indicated by the reference numeral 20 and includes a stator means 21, a plunger 22 and a frame 23. The stator means 21 includes an elongate laminated block 21a formed of a plurality of flat strips 21b of paramagnetic material each being identical to have the shape shown and being aligned and compressed together to form the unitary block 21a with sufficient strips being provided to produce the desired width. The shape of each strip 21b and hence the side of the block is shown in FIG. 1 and thus the block is formed to provide pole pieces 24, 25, 26, 27, 28, 29, 30 and 31. While there are eight pole pieces, in the specific embodiment of the motor 20 herein specifically described, it will of course be clear that a greater or lesser number may be employed if desired as set forth hereinafter.

All of the pole pieces are identical and specifically referring to the pole piece 24, it being appreciated that the other pole pieces will have the same structure, it has a narrow intermediate section 24a about which is positioned a winding 24b and an outer surface 24c on which a plurality of equally spaced teeth 24d are formed. The pole pieces 25–31 inclusive are similarly constructed and thus have narrow sections 25a–31a, windings 25b–31b and teeth 25d–31d respectively.

The stator means 21 is mounted on a base 32 of the frame 23 that has a cutout 33 formed therein that receives the lower edge portions 34 of the block 21a. Bolts 35 extend through the base 32 and the laminations to secure the laminations together and to the base. Extending upwardly from the base 32 and secured thereto are plurality of angle members 36 which carry at their upper end ball bearings 37. The ball bearings 37 support the plunger 22 by riding in grooves 38 formed in end members 39 of the plunger to thus support the plunger a determinate distance from the outer surfaces 24c through 31c of the stator pole pieces. In addition, for preventing vertical separation of the plunger 22 from the stator means 21 U-shaped straps 40 are secured to the base 32 and extend over the top of the plunger. The straps 40, end members 39, angle members 36, base 32 are formed from non-magnetizable material, such as brass or aluminum.

Referring specifically to FIG. 2, the end members 39 of the plunger 22 are secured to the side edges of a rectangular piece of soft iron 41 (as by screws 42) and the piece 41 is formed to have a surface 43 from which teeth 44 project. The teeth 44 may have the shape shown, i.e. rectangular, and extend throughout the width of the piece 41, the latter having a width substantially identical to the width of the block 21a and the teeth 44 are equally spaced with a constant tooth pitch.

With the above-recited structure of the plunger 22 and stator means 21 and with the plunger positioned with respect to the stator means, as shown in FIGS. 1 and 2, it will be appreciated that the surfaces 43 and 24c through 31c both lie adjacent each other but are spaced therefrom with the bearings 37 and grooves 38 permitting movement of the plunger with respect to the stator means only in the direction indicated by an arrow 45. Moreover, it will be appreciated that while the surfaces 42 and 24c through 31c are planar and parallel they both could be arcuate if desired and thus the stator pole surfaces are aligned in the path of travel of the plunger with their teeth 24d through 31d extending transversely of the line of travel as also the plunger teeth 44 so extend. In addition, in this particular embodiment of the reciprocating electric motor 20, each of the stator pole piece teeth 24d through 31d has the same constant tooth pitch with each pole piece being differentially displaced from its adjacent pole piece by one fourth of a plunger tooth pitch.

In the operation of the above-described motor, the windings 24b through 31b are energized in such a manner that the plunger moves ¼ of the plunger tooth pitch for each change in energization of the windings. Thus as shown in FIG. 1, with the pole piece 24 magnetized N and the pole piece 25 magnetized S, the plunger will assume a position in which a plunger tooth 44a and a middle stator pole tooth 24e and a plunger tooth 44b and a stator pole tooth 25e are almost aligned. This will produce an incremental movement rightward from the solid line position of the plunger shown in FIG. 1. To produce the next incremental movement the magnetization of the pole piece 25 is maintained S and pole piece 26 is magnetized N with the cessation of magnetization of the pole piece 24. This causes the teeth 44b and 25e and 44c and 26e to become almost aligned to provide a minimum reluctance path through the piece 41 and produce a ¼ plunger tooth pitch movement of the plunger rightward from its previous position. The next ¼ tooth movement of the plunger is achieved by maintaining pole piece 26 N and energizing pole piece 27 S (while ceasing magnetization of pole piece 25) the cause teeth 44c and 26e and 44d and 27e to become substantially aligned. The next incremental movement of the motor is achieved by maintaining pole piece 27 S and energizing pole piece 28 N while deenergizing the pole piece 26 to cause teeth 44d and 27e and 44e and 28e to become substantially aligned. The final ¼ tooth pitch movement of the plunger is achieved by maintaining pole piece 28 magnetized N, ceasing magnetization of pole piece 27 and magnetizing pole piece 29 S to cause substantial alignment between teeth 44e and 28e and 44f and 29e. In addition, plunger tooth 44g has thus advanced to the position initially assumed by tooth 44a and thus the incremental advancing may be continued by repeating the above-recited steps.

Referring to FIG. 5, there is shown a control circuit 46 having pole pieces 24 through 31 and windings 24b through 31b magnetically associated therewith with the latter being connected to a source of electrical energy which may be a battery 47. The negative side 48 of the battery is common to all the windings while the positive side is connected through a pair of switches 49 and 50 to the various windings as shown. With the switches 49 and 50 in the solid line position shown, i.e. engaging contacts 49a and 50a, the windings 24b and 28b are connected in parallel and thus render their associated pole pieces 24 and 28 N while windings 25b and 29b are also connected in parallel but render their associated pole pieces 25 and 29 S and thus the control circuit effects the magnetization for the first step described above. For achieving the next incremental movement of the plunger, the switch 49 is thrown to engage contact 49b, the switch 50 remaining as previously. This condition energizes pole pieces 26 and 30 N while maintaining pole pieces 25 and 29 S. The next step is achieved by maintaining the switch 49 engaging the contact 49b and shifting the switch 50 to engage the contact 50b to thereby effect deenergization of the windings 25b and 29b while rendering pole pieces 27 and 31 S. Subsequently the fourth step in moving the plunger an increment of movement corresponding to a plunger tooth pitch is achieved by maintaining the contact 50b while shifting the energization from the contact 49b to the contact 49a which renders pole pieces 24 and 28 N and 27 and 31 S, the other poles of course not being magnetized. The next step to move the plunger incrementally is to repeat the first-described step to have the contacts 49a and 50a be engaged which effects the magnetization of the pole pieces in the first position above described.

By repeating this sequence of operation it will be understood that the plunger can then be advanced ¼ of a tooth pitch for each change in magnetization of the pole pieces. Moreover, if the manner of energization is reversed the plunger can be caused to move in the opposite direction. It is essential that each of the stator pole pieces for a ¼ incremental movement be displaced along the path of travel of the plunger from its adjacent pole pieces by a differential of ¼ of a plunger tooth pitch. While this may be accomplished by having the stator and plunger tooth pitch the same, the present embodiment accomplishes the differential displacement by having a slightly different pitch between the stator and plunger teeth. Thus, in the same length the plunger is formed to have 25 teeth while the stator means is formed to provide only 24 stator teeth. In this manner each of the stator pole pieces may have identical tooth surfaces but yet the spacing between pole piece equal to one and one half times the stator tooth pitch plus the ¼ plunger tooth pitch differential will automatically be produced. However, while slightly different pitches between the stator and plunger teeth prevent exact alignment between the stator and plunger teeth, for example 44b and 25e and 44c and 26e or any of the other teeth when the motor is energized, such as not been found to be adverse to the operation of the motor as the plunger teeth at the two energized poles will assume a position of having the minimum reluctance path and hence proportion the difference equally therebetween. This has been found at times to produce a desirable movement of the plunger by decreasing the jerkiness of the plunger movement.

In the above-described embodiment of the invention the motor is basically a four-step motor because the pole pieces 28 through 31 are energized with the pole pieces 24 through 27. Thus whenever pole piece 24 is energized pole piece 28 is similarly energized to have the same magnetic polarity as are pole pieces 25 and 29, 26 and 30 and 27 and 31. Accordingly, is desired, the motor may be made with eight pole pieces shown or with just four pole pieces or with a multiple of four pole pieces in order to produce a ¼ tooth movement.

Shown in FIGS. 6 and 7 is another embodiment of a reciprocating electric motor of the present invention, generally indicated by the reference numeral 60. This embodiment provides for movement of the plunger in ⅛ plunger tooth pitch increments and thus there are shown eight pole pieces denoted 61–68 inclusive with it being understood that each is identical and though eight poles are shown more may be used if so desired in the motor 60. Each of the pole pieces 61–68 is formed of substantially C-shaped laminations 69 to have a narrowed bight portion 70. A winding encircles each bight portion and thus there are windings 61a–68a. In addition each pole piece has a pair of parallel pole surfaces 61b and 61c for the pole piece 61 between which is supported a plunger 71 having an upper tooth surface 72 and a lower tooth surface 73. The plunger is mounted for reciprocating movement by means of ball bearings 74 in the path defined by the surfaces 61b–68b and 61c–68c to be equally spaced therefrom. The toothed surfaces are formed on a piece of soft iron 75 having substantially no retained magnetism and teeth 72a and 73a on the surfaces 72 and 73 respectively are of equal pitch and aligned in addition to extending transversely of the path of movement of the plunger. The stator pole piece 61 has teeth 61d and 61e formed on the surfaces 61b and 61c respectively as do the other pole pieces 62d–68d and 62e–68e with respect to their surfaces with all these stator pole teeth having the same tooth pitch and being aligned transversely of the line of travel of the plunger.

In this embodiment each of the pole pieces 61, 62 and 63 etc. is magnetized sequentially to move the plunger ⅛ of a tooth pitch, it being understood that the pole pieces are differentially spaced ⅛ of a plunger tooth pitch apart and the pitch of the plunger teeth may be equal to or, as described in connection with the motor 20, of a slightly different pitch than the tooth pitch of the stator pole teeth 61d–68d and 61e–68e, the latter condition being shown in this embodiment of the invention.

In FIG. 8 there is shown an electrical schematic diagram of a control circuit 76 which may be utilized to control the movement of the plunger 71. Thus windings 61a, 62a, 63a, 64a, 65a, 66a, 67a and 68a are shown connected in parallel to a battery 77. Additionally switches 61b, 62b, 63b, 64b, 65b, 66b, 67b and 68b are connected to control the energization of their respective winding. Thus if all the switches are open except the switch 61b then the coil 61a is energized (in this embodiment it is immaterial which magnetic polarity the surfaces 61b and 61c have as the flux produced by the windings extends through the piece 75) and thus with winding 61a energized and pole piece 61 magnetized, the plunger 71 will assume a position which substantially aligns the plunger teeth with the stator pole teeth 61d and 61e. Upon opening switch 61b and closing switch 62b only pole 62 is magnetized, which by reason of it being differentially spaced ⅛ of a plunger tooth pitch from the pole piece 61 causes the plunger to advance ⅛ of a tooth pitch to substantially align the teeth 62d and 62e with the plunger teeth. Subsequently each of the poles is magnetized and the plunger is caused to move ⅛ of a plunger tooth pitch with each change in energization. As there is only one pole piece magnetized at a time, the center tooth of such pole piece will be exactly aligned with a plunger tooth with the other pole piece teeth being almost aligned.

It will be understood that in each embodiment of the motor herein described that while the steps thereof have been described to cause the plunger to move in one direction, that a reversal of the steps will cause the plunger to move in the other direction. Furthermore, if the winding energization is maintained constant, the plunger tends to resist movement from that position which the energization caused and hence the plunger in effect is magnetically braked against movement.

It will additionally be appreciated that in all embodiments of the invention, whether the pole pieces are located on the same side or on opposite sides of the plunger, that the pole pieces have their pole surfaces aligned with the path of travel of the plunger and are spaced apart along said path of travel.

While there has been disclosed a control circuit for each of the embodiments of the motors heretofore described, it is to be understood that other and different circuits, such as automatic circuits, may be employed if so desired provided they magnetize the pole pieces to cause the same changes in polarity of the pole pieces. As used herein, a change in magnetic polarity includes a change from a condition of magnetization of either polarity to a condition of no magnetization by the winding means and vice versa.

It will accordingly be appreciated that there have been disclosed embodiments of reciprocating electric motors in which a change in energization thereof causes an incremental linear movement. In all embodiments the motor has a plunger formed with teeth having a constant pitch and stator means formed to provide distinct pole pieces with each pole piece being formed with teeth having a constant pitch. By changing the polarity of magnetization of at least one of two adjacent pole pieces, the plunger is caused to move an incremental step related to its tooth pitch. The number of incremental steps required to advance the plunger one tooth pitch has been disclosed as being four or eight though it will be understood that the invention is not limited thereto but encompasses other incremental portions of the tooth pitch. While some embodiments of the motor have had pole pieces on only one side of the plunger and other embodiment on two sides, all embodiments however have adjacent pole pieces differentially disposed in the line of movement of the plunger a distance related to the number of steps of the plunger required to move one plunger tooth pitch.

Variations and modifications may be made within the scope of the claims and portions of the improvements may be used without others.

I claim:

1. A linear electric motor and control circuit for producing an incremental linear movement comprising a frame, stator means mounted on said frame and formed to provide at least two pole pieces, winding means magnetically associated with the pole pieces, each of said pole pieces having an outer pole surface that is formed with equally spaced teeth, an elongate plunger having at least one longitudinal plunger surface formed to provide equally spaced plunger teeth extending transversely of said surface, means mounting the plunger for reciprocating movement with respect to the stator means to have the plunger surface travel along a linear path with the plunger teeth extending transversely of the path, the pole surfaces being aligned and spaced along said path with the teeth of the pole surfaces extending transversely of said path and a control circuit adapted to be connected to a source of electrical energy and the winding means to change the magnetic polarity of at least one of said pole pieces to effect a linear movement of the plunger that is a fraction of the tooth pitch of the plunger teeth.

2. A linear electric motor and control circuit for producing an incremental linear movement comprising a frame, stator means mounted on said frame and formed to provide at least two pole pieces, winding means magnetically associated with the pole pieces, each of said pole pieces having an outer pole surface that is formed with equally spaced teeth, an elongate plunger having at least one longitudinal plunger surface formed to provide equally spaced plunger teeth extending transversely of said surface, means mounting the plunger for reciprocating movement with respect to the stator means to have the plunger surface travel along a linear path with the plunger teeth extending transversely of the path, the pole surfaces being aligned along said path with the teeth of the pole surfaces extending transversely of said path and being spaced to have a tooth of one pole surface and a tooth of the plunger being oppositely aligned while a similar tooth of the other pole surface is a fraction of the plunger tooth pitch misaligned from an oppositely disposed plunger tooth and a control circuit adapted to be connected to a source of electrical energy and the winding means to change the magnetic polarity of at least one of said pole pieces to effect a linear movement of the plunger that is the fraction of the tooth pitch of the plunger teeth.

3. A linear electric motor and control circuit for producing an incremental linear movement comprising a frame, stator means mounted on said frame and formed to provide at least three pole pieces, winding means magnetically associated with the pole pieces, each of said pole pieces having an outer pole surface that is formed with equally spaced teeth, an elongate plunger having at least one longitudinal plunger surface formed to provide equally spaced plunger teeth extending transversely of said surface, means mounting the plunger for reciprocating movement with respect to the stator means to have the plunger surface travel along a linear path with the plunger teeth extending transversely of the path, the pole surfaces being aligned along said path with the teeth in the pole surfaces extending transversely of said path and said pole surfaces being equally spaced to have a tooth of one pole surface be oppositely aligned with a tooth of the plunger and with a similar tooth of the next pole surface being a fraction of the plunger tooth pitch misaligned from an oppositely disposed plunger tooth and with a similar tooth of the third pole surface being twice the fraction of the plunger tooth pitch misaligned from an oppositely disposed plunger tooth and a control circuit adapted to be connected to a source of electrical energy and the winding means to change the magnetic polarity of at least one of said pole pieces to effect a linear movement of the plunger that is the fraction of the tooth pitch of the plunger teeth.

4. The invention as defined in claim 3 in which the plunger surface is formed on an elongate length of paramagnetic material that is free of retained magnetism.

5. The invention as defined in claim 3 in which the plunger is formed with a second longitudinal plunger surface formed with equally spaced teeth extending transversely of the path with the tooth pitches of the teeth of the first and second plunger surfaces being identical.

6. The invention as defined in claim 5 in which the teeth of the second plunger surface and first-mentioned plunger surface are aligned.

7. The invention as defined in claim 3 in which the control circuit energizes the winding means to cause two adjacent pole pieces to have opposite magnetic polarity and the change in energization of the winding means causes the polarity of the pole pieces to be reversed.

8. The invention as defined in claim 3 in which the control circuit energizes the winding means to cause two adjacent pole pieces to each have a magnetic polarity and the change in energization causes one pole piece to be free of magnetization by the winding means and maintain the same magnetic polarity of the other pole piece.

9. The invention as defined in claim 3 in which the winding means consists of an independent single winding for each pole piece.

References Cited by the Examiner
UNITED STATES PATENTS
3,162,796   12/1964   Schreiber et al. _____ 310—12 X

OTHER REFERENCES

IBM Technical Disclosure Bulletin, vol. 6, No. 9, February 1964.

MILTON O. HIRSHFIELD, *Primary Examiner.*

D. F. DUGGAN, *Assistant Examiner.*